United States Patent [19]

Brucker

[11] 3,833,786
[45] Sept. 3, 1974

[54] LASER APPARATUS FOR FENESTRATION OF CONTACT LENSES

[75] Inventor: Donald Brucker, San Diego, Calif.

[73] Assignee: Continuous Curve Contact Lenses, Inc., San Diego, Calif.

[22] Filed: June 8, 1973

[21] Appl. No.: 368,193

[52] U.S. Cl............ 219/121 L, 51/216 LP, 269/21, 269/57, 269/58
[51] Int. Cl............................................ B23k 27/00
[58] Field of Search......... 219/121 L, 121 LM, 384; 51/216 LP, 284, 235; 269/21, 71, 57, 58

[56] References Cited
UNITED STATES PATENTS

| | | | |
|---|---|---|---|
| 2,389,744 | 11/1945 | Robbins................................ | 269/57 |
| 3,227,855 | 1/1966 | Meyer et al......................... | 219/384 |
| 3,396,598 | 8/1968 | Grispo.................................. | 269/58 |
| 3,528,326 | 9/1970 | Kilmer et al. ................ | 51/216 LP X |
| 3,563,186 | 2/1971 | Piper et al. ......................... | 269/71 |

OTHER PUBLICATIONS
"Precise Perforations Every Time," Tool & Manufacturing Engineer, 11/1969, pp. 46–49.

*Primary Examiner*—J. V. Truhe
*Assistant Examiner*—Clifford C. Shaw
*Attorney, Agent, or Firm*—Brown and Martin

[57] ABSTRACT

Laser apparatus for fenestration of contact lenses by forming consistently precise perforations being normal to the adjacent surfaces of the lens and with the inside diameter of the perforations being larger than the outside diameter; and having smooth and effectively polished surfaces. A lens is held by vacuum on a positioning mechanism, which is magnetically held on a base for coarse positioning, and incorporates two-axis stick controlled adjustment means for precise positioning of the lens relative to the laser beam. The lens support has indexing means for rotating the lens to a predetermined number of positions to space the perforations evenly adjacent the periphery of the lens.

5 Claims, 7 Drawing Figures

PATENTED SEP 3 1974 3,833,786

3,833,786

LASER APPARATUS FOR FENESTRATION OF CONTACT LENSES

BACKGROUND OF THE INVENTION

Some people with sensitive eyes are unable to wear contact lenses for any length of time, if at all, due to irritation and corneal edema. The conditions can be relieved by proper circulation of pre-corneal fluid, which is a natural result of blinking. To avoid entrapment of fluid under a contact lens, the technique of fenestration has been applied, that is, one or more perforations are made in the lens. Blinking then causes a pumping action and circulation of fluid through the perforations, so providing lubrication and reducing the build-up of corneal edema.

However, attempts at fenestration have been generally unsatisfactory due to the extremely small size and materials from which contact lenses are made. With conventional drilling technique the perforations are rough and the edges are jagged, which can cause severe irritation. Since the perforations are normally a fraction of a millimeter in diameter, polishing of the edges is extremely difficult, and the risk of lens damage or breakage is considerable. To make fenestration practical, it is necessary to make precise perforations with very smooth surfaces and edges, without damaging the surrounding lens material and with a minimum of labor.

SUMMARY OF THE INVENTION

The apparatus described herein is capable of forming precisely positioned perforations of the desired venturi configuration in a contact lens, with surfaces and edges which have a polished quality without requiring additional work. The technique is particularly effective with lathe turned plastic lenses, but is also adaptable to other types. The perforations are made by a laser mounted in fixed position above a work base, to provide a focussed laser beam at a specific location. On the work base is a positioning mechanism held approximately in place by a magnet, and having fine control adjustment means for precise positioning of a lens holder relative to the laser beam. The lens holder is a tube on which the lens is held by a vacuum, with the peripheral portion extending beyond the tube. The holder is inclined so that the surface of the lens is substantially normal to the laser beam, in order to minimize the length of the penetration through the lens. Indexing means is used to rotate the lens holder for spacing perforations evenly at a predetermined number of peripheral positions. The fine adjustment means uses a single control stick for two-axis motion and also incorporates means for adjusting the height of the lens holder.

The venturi shaped holes with a larger opening on the inside surface of the lens, aid in creating a pumping action that with movement of the lens circulates the fluid underneath the lens and to the surface outside of the lens.

The primary object of this invention, therefore, is to provide a new and improved laser apparatus for fenestration of contact lenses.

Another object of this invention is to provide a new and improved laser apparatus capable of producing precisely positioned and smoothly finished perforations in a contact lens.

Another object of this invention is to provide a new and improved laser fenestration apparatus having mechanical means for precisely holding and positioning a lens at successive indexed positions relative to the laser beam.

A further object of this invention is to provide a new and improved laser fenestration apparatus which is simple to operate and requires a minimum of technical skill to produce a high quality fenestrated lens.

Other objects and many advantages of this invention will become more apparent upon a reading of the following detailed description and an examination of the drawing, wherein like reference numerals designate like parts throughout and in which.

DESCRIPTION OF THE PREFERRED EMBODIMENT

Figure 1:
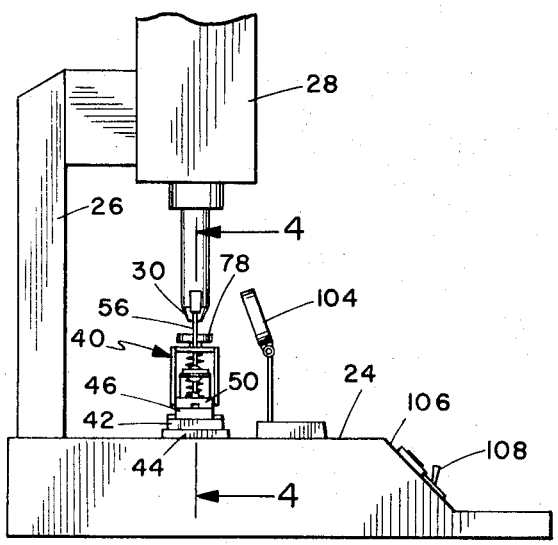
FIG. 1 is a side elevation view of the apparatus.
Figure 2:
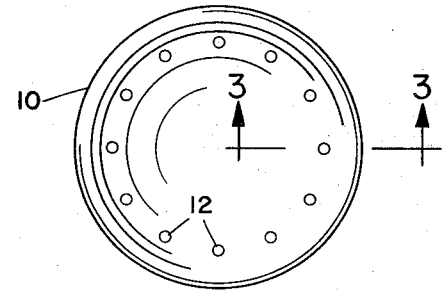
FIG. 2 is an enlarged plan view of a typical contact lens with fenestration completed.
Figure 3:
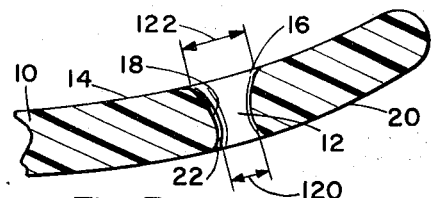
FIG. 3 is an enlarged sectional view taken on line 3—3 of FIG. 2.

A typical lens produced by the apparatus is illustrated in FIGS. 2 and 3. The lens 10 has evenly spaced perforations 12 adjacent the periphery, twelve perforations being indicated as an example. The actual number of perforations will vary according to the size of the lens and the severity of the edema condition. Such lenses may be from about 7 to 10 mm in diameter, larger sizes being used by some athletes, or for certain optical conditions such as aphakia or de-centered pupils.

The perforations should not be so close to the edge as to cause structural weakness, nor too close to the center where they would interfere with vision. Also, the diameter of the perforations should be as small as possible, while allowing adequate fluid flow without undue danger of becoming obstructed. It has been found that perforations on the order of 0.2 mm in diameter are ideal.

The use of a laser results in a finished perforation, as in FIG. 3. The intense heat of the laser initially striking the concave or posterior surface 14 forms a flared entry portion 16, converging to the optimum diameter bore 18. At the convex or anterior surface 20, the emerging laser beam flares the edge slightly into a rounded exit 22. It has been found that the entire surface of the bore and the flared portions have a finish comparable to a fire polish, and no further finishing is necessary.

This provides a hole shape that is larger on the inside surface than on the outside, creating a venturi shape. This shape functions to pump the fluid through the holes 12, thus increasing the circulation of the fluid underneath the lens to the outside. Through the mechanism of blinking, a pumping action results that forces fluid out through the holes and thereby draws fresh fluid underneath the lens. This is a very efficient way of improving pre-corneal circulation under the lens with all the additional advantages that such circulation provides, and also increases tear and gas exchange. The drilling of the holes through the lens does not affect the characteristics of the lens, which remains essentially the unchanged.

The smallest diameter 120 of each of the holes is about 0.2 mm. The 0.2 mm size allows a reasonable fluid flow through each hole as the diameter is large enough to over come the tendency of surface tension of the pre-corneal fluid to impede passage. Also, the holes have the larger inner diameter 122 opening 16, that may be in the order of 0.3 mm that with the smooth surfaces provides volume gathering of fluid in increased pressure discharge through opening 12. Further there is less turbulence in fluid flow because of the venturi action, and there is less optical interference by the holes because the smaller diameter opening is at the outer surface of the lens where most of the refraction occurs.

The laser apparatus is mounted on a base housing 24, which contains the controls and serves as a work table. A post 26 on the rear of housing 24 supports the laser 28 in a vertical position, with the focussing tip 30 directed downwardly. The power supply and associated support equipment, not shown, will depend on the type of laser use, and is conventional. In the housing directly below the laser is an opening 32, under which is a heat sink 34 containing an asbestos pad 36, or the like, to absorb the residual energy of the laser beam 38.

The lens is held on a positioning mechanism, generally indicated at 40, the mechanism having a base plate 42 which is held on housing 24 by a magnet 44. The magnet facilitates approximate location of the mechanism to suit the operator. On top of base plate 42 is a lateral slide block 46, guided in sliding motion by a key 48. On the lateral slide block is a longitudinal slide block 50, guided by a key 52 perpendicular to key 48. Any suitable orthogonal slide or guide means may be used to provide two axis horizontal motion of the slide block 50, to which the lens mounting is attached.

Figure 4:
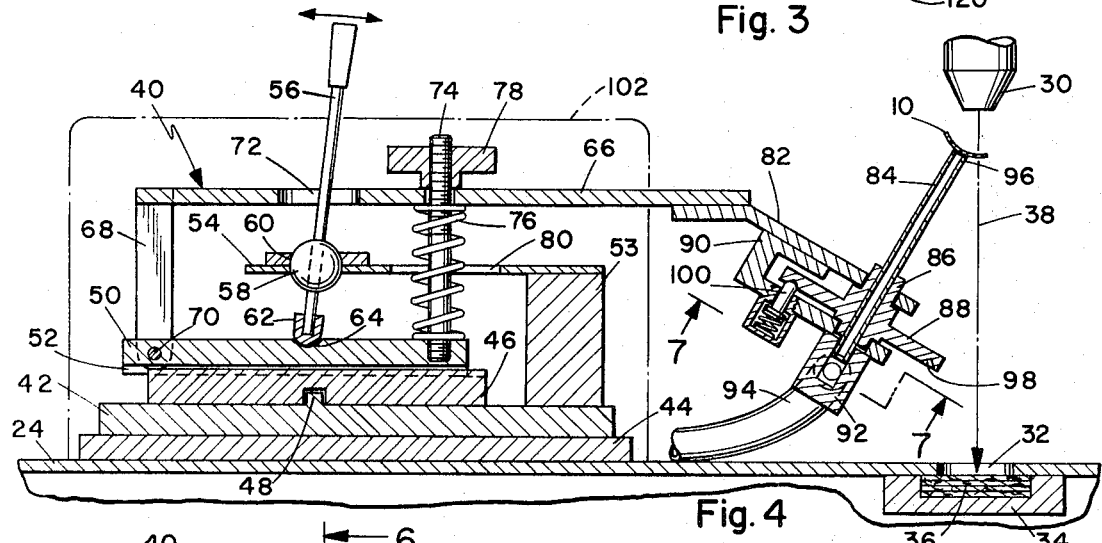
FIG. 4 is an enlarged sectional view taken on line 4—4 of FIG. 1.
Figure 6:
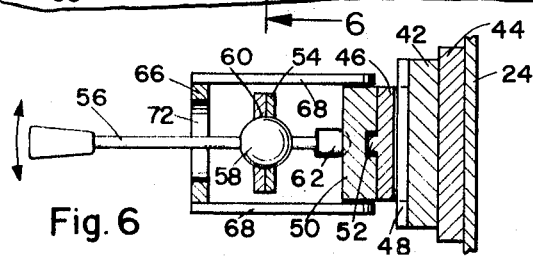
FIG. 6 is a sectional view taken on line 6—6 of FIG. 5.
Figure 7:
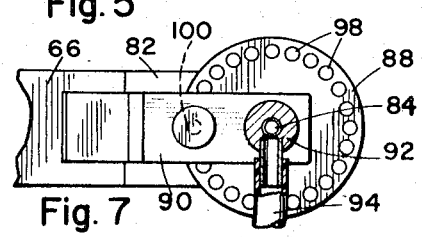
FIG. 7 is a sectional view taken on line 7—7 of FIG. 4.

Fixed to base plate 42 is a post 53, on top of which is a leaf spring arm 54 extending over the slide block structure. Mounted on spring arm 54 is a control stick 56, having a ball element 58 which is held in a socket 60 on the arm for free pivotal movement of the stick. On the lower end of control stick 56 is a ball pad 62 which seats in a socket 64 in slide block 50. The spring arm 54 holds the slide block assembly firmly on base plate 42, but allows two axis motion of slide block 50 by motion of the control stick, as indicated by directional arrows in FIGS. 4 and 6.

Above the spring arm 54 is a longitudinally extending support arm 66, having downwardly projecting legs 68 at one end. The legs 68 are attached by a hinge pin 70 to the slide block 50 at the end remote from post 53, so that the support arm can swing vertically. Control stick 56 projects upwardly through a clearance opening 72 in support arm 66. Fixed in slide block 50, at the opposite end from hinge pin 70, is an adjustment screw 74 which extends upwardly through support arm 66. A spring 76 fitted over screw 74 biases the support arm 66 upwardly and a knob 78 threaded on the screw above the support arm allows vertical adjustment of the arm. Spring arm 54 has a clearance opening 80 for the screw 74 and spring 76.

On the free end of support arm 66 is a downwardly inclined extension arm 82, which carries the lens supporting stem 84. The stem is a thin tube having a diameter substantially less than that of the smallest lens to be held. Stem 84 is mounted in the hub 86 of an indexing disc 88, which is rotatably mounted in extension arm 82 and supported in a bracket 90. The lower end of stem 84 fits into a connector 92, from which a hose 94 leads to a suitable source of vacuum, not shown. The upper end of stem 84 forms a seat 96, on which lens 10 is held by vacuum, the stem being inclined to vertical to hold the lens in the path of the laser beam 38, leaving a clear path for the beam below the lens, as in FIG. 4. In the underside of indexing disc 88 are peripherally spaced indexing sockets 98, which are selectively engaged by a spring loaded detent pin 100 mounted in bracket 90. As illustrated, the indexing disc has 24 sockets which allow the lens to be rotated to 1,2,3,4,6,8,12, or 24 evenly spaced positions. Any suitable number of indexing sockets may be used, either in a single ring or in multiple concentric rings with appropriate detents.

Figure 5:
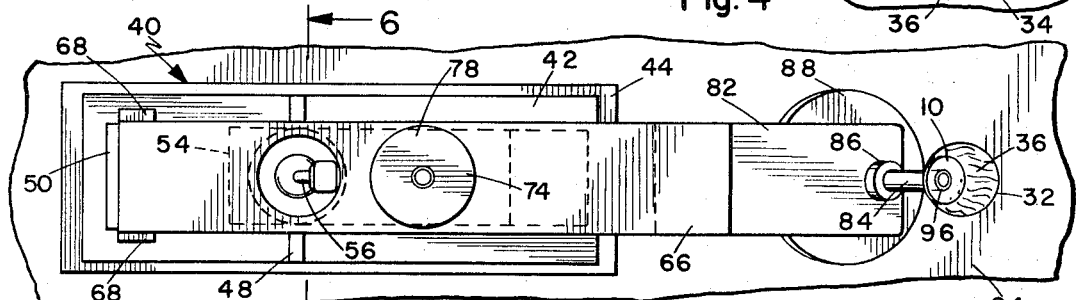
FIG. 5 is a top plan view of the structure of FIG. 1.

In setting up the apparatus, the positioning mechanism 40 is placed at a convenient position for the operator and held by magnet 44, the seat 96 of the lens holding stem being near the laser beam location. A cover 102 of any suitable type may be fitted over the mechanism, as indicated in broken line in FIG. 4, to protect the mechanism and provide a rest for the operator's hand in moving the control stick. A lens 10 is placed on seat 96 and centered, the small size making it practical to align the lens by eye against the ring of the seat, as seen in FIG. 5. For final alignment, the lens is adjusted by means of control stick 56, to position the peripheral protion of the lens in the path of the laser beam. To assist in the alignment, a suitable stand mounted magnifier 104 may be placed on housing 24 for the operator to view the lens. A laser beam position reference is used to align the lens precisely. The reference may be provided by operating the laser at a low power setting, or by a reference light source incorporated in the laser optics, the technique being well known. Knob 78 is used to adjust the height of the lens to the focal point of the laser beam for efficiency and uniformity of perforation.

For convenience, the housing 24 has a control panel 106, on which are the necessary controls for power supply, laser support equipment and the laser firing control. With a laser of suitable power, a single short pulse is sufficient to make each perforation, the lens being indexed to the required position after each laser action to obtain the predetermined number of perforations. Since the fenestration is completed by the laser, the only skill involved is in positioning the lens, which is easily learned. Completed lenses need only conventional cleaning before being ready for use.

Having described my invention, I now claim:

1. Laser apparatus for fenestration of contact lenses, comprising:

a housing;

a laser mounted on and having its beam path directed toward said housing;

said mechanism having a lens holder with a seat for holding a lens thereon, with the peripheral portion of the lens extending into the path of the laser beam;

indexing means on said lens holder for rotatably indexing the lens to predetermined peripheral positions relative to the laser beam, said positioning mechanism includes a base plate and a slide block mounted on said base plate for motion in at least one direction, said lens holder being secured to said slide block, said slide block is movable in two orthogonal directions, control means coupled to said slide block for selective movement thereof, a spring arm mounted on said base plate, and said control means comprising a stick pivotally mounted on said spring arm and having an end portion biased into pivotal engagement with said slide block.

2. Apparatus according to claim 1, and including a support arm extending from said slide block, said lens holder being mounted on one end of the support arm; and means for adjusting said support arm to move the lens holder substantially along the path of the laser beam.

3. Apparatus according to claim 2, wherein said lens holder comprises a hollow stem with said seat on one end thereof, the other end of said stem having means for connection to a source of vacuum.

4. Apparatus according to claim 3, wherein said stem is inclined with the seat end thereof extending toward the laser beam path.

5. Apparatus according to claim 4, wherein said seat is substantially smaller than the lens, the inclination of said stem being such that the peripheral portion of the lens intersecting the path of the laser beam is substantially normal to the beam.

* * * * *